United States Patent

[11] 3,595,572

| [72] | Inventor | Gerald L. Granda<br>Springfield, Ill. |
|---|---|---|
| [21] | Appl. No | 11,095 |
| [22] | Filed | Feb. 13, 1970 |
| [45] | Patented | July 27, 1971 |
| [73] | Assignee | Allis-Chalmers Manufacturing Company<br>Milwaukee, Wis. |

[54] TRACK PIN AND BUSHING JOINT SEAL
5 Claims, 6 Drawing Figs.

[52] U.S. Cl. .................................................. 277/92,
305/11
[51] Int. Cl. ........................................... F16j 15/00
[50] Field of Search............................... 305/11, 12,
13; 277/92, 81

[56] References Cited
UNITED STATES PATENTS

| 3,244,457 | 4/1966 | Ross | 277/92 X |
|---|---|---|---|
| 3,389,921 | 6/1968 | Lojkutz | 277/42 X |
| 3,437,385 | 4/1969 | Deli | 305/11 |

*Primary Examiner*—Robert I. Smith
*Attorneys*—Charles L. Schwab, Robert B. Benson and Kenneth C. McKivett ABSTRACT: A pin and bushing face-type seal for an endless track belt of the type used on crawler tractors designed with a figuration producing effective sealing over a relatively wide range of variations of axial spacing between the end of the bushing and the confronting track link sidebar.

PATENTED JUL27 1971 3,595,572
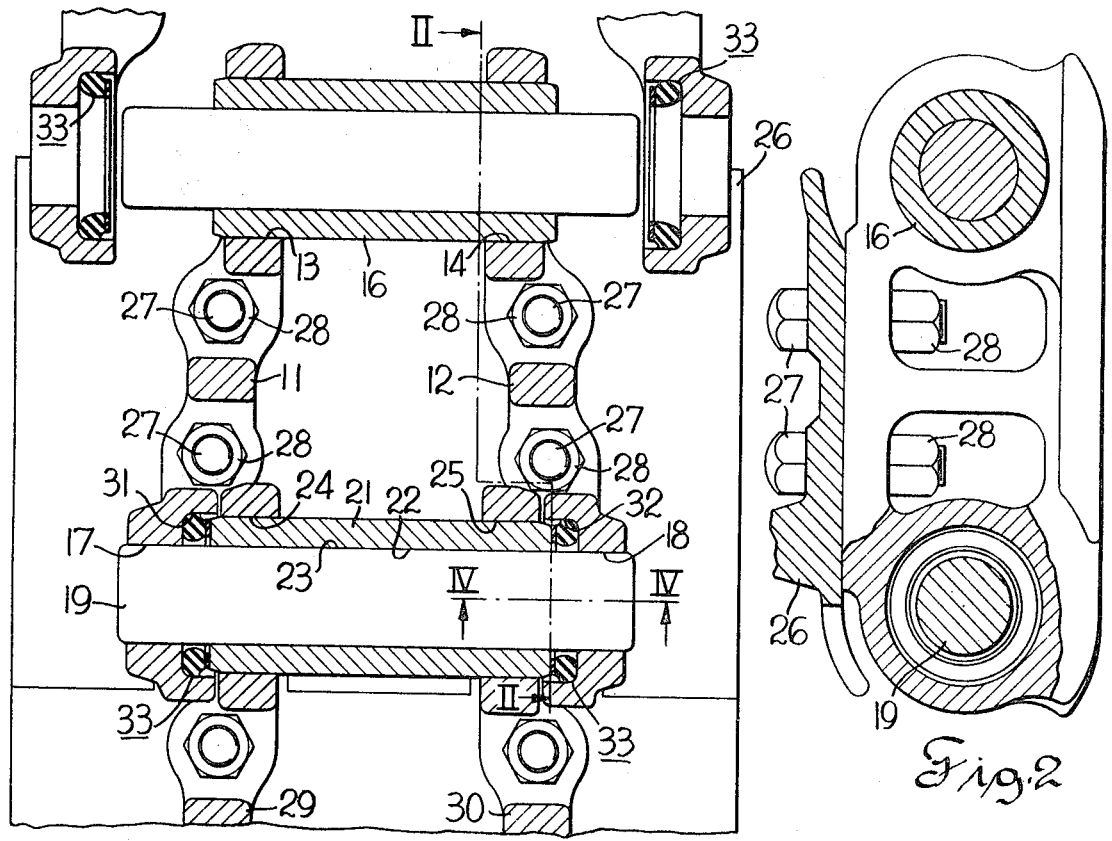
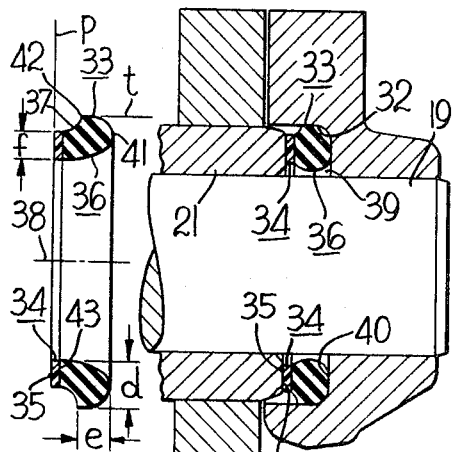
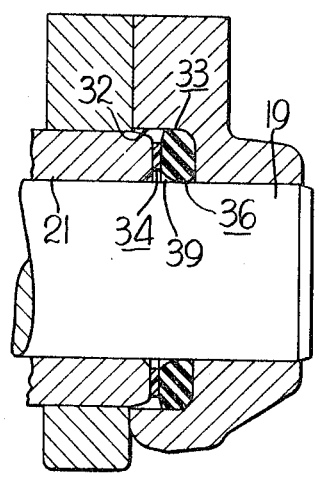
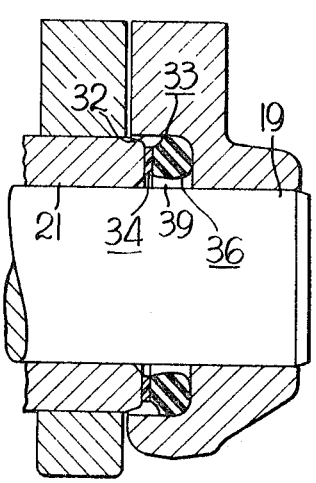
Fig.1 Fig.2 Fig.3 Fig.4 Fig.5 Fig.6
Inventor
Gerald L. Nanda

TRACK PIN AND BUSHING JOINT SEAL

This invention relates to sealing pin and bushing joints of an endless track and more particularly to a special design of the flexible portion of a face-type seal component which allows it to apply effective sealing pressure over a wide range of axial confinement conditions.

Heretofore, seals of various types have been proposed for endless track belts; however, these have not proved entirely satisfactory in cost and operation. The seal of this invention is, for instance, an improvement over an earlier seal described in U.S. Pat. No. 3,244,457 issued to Roy C. Ross on Apr. 15, 1966. One disadvantage found to exist in the seal of the before-mentioned patent is that its proper functioning was limited to a narrow range of axial confinement. When confined to a small axial space the compressive forces caused the flexible portion to separate from the hard seal ring to which it was bonded or the flexible material would fail adjacent the hard seal ring. It has also been found that the prior seal was not capable of applying effective sealing pressure over a sufficiently wide range of axially confined conditions. For instance, in some conditions of manufacturing and assembly tolerance build, up, the axial space for the seal was greater than normal and the prior seal did not urge its sealing face against the end of the bushing with sufficient force to achieve effective sealing. Also it was found in some instances that particles tended to wedge between the flexible portion and the sidebar counterbore thus tending to destroy the static seal and permit the seal to rotate in the counterbore as the track flexes.

It is a general object to the present invention to provide a seal so designed in relation to the cavity in which it fits that it will operate satisfactorily under a wide range of conditions of axial confinement.

A further object of this invention is to provide a seal design which will apply effective sealing pressure to sealed members even though in various installations the distance from the sealing face to the bottom of the cavity in which the seal is disposed varies substantially.

It is a general object of this invention to provide a sealed track which has greater useful life because the seals perform in an effective manner for a longer length of time.

It is a further object of the present invention to provide a seal as hereinbefore outlined which more effectively excludes foreign material from the contact area between the flexible portion and the sealed member which it nonrotatably bears against.

These and other objects and advantages of this invention will be apparent to those who are familiar with the art when the following description is read in conjunction with the drawings in which:

FIG. 1 is a section view of a portion of an endless track in which the present invention is incorporated;

FIG. 2 is a section view taken along the line 11–11 in FIG. 1;

FIG. 3 is a section view of the seal of the present invention in its uninstalled state;

FIG. 4 is a section view of the taken along the line IV–IV of FIG. 1 and showing the seal in a normal pin and bushing installation;

FIG. 5 is a view similar to FIG. 4 showing the seal in an axially reduced seal cavity; and FIG. 6 is a view similar to FIG. 4 showing the seal in an axially extended seal cavity.

Referring to FIGS. 1 and 2 the endless track in which the present invention is illustrated includes a pair of laterally spaced sidebars 11, 12 having aligned bushing bores 13, 14 in which a bushing 16 is press fit. The opposite ends of the sidebars 11, 12 have aligned pin bores 17, 18 in which a pin 19 is press fit. The bushing 21 of the adjacent track link is press fit in aligned bores 24, 25 of sidebars 29, 30 and has an inner cylindrical surface 22 in thrust-transmitting bearing engagement with the outer cylindrical surface 23 of the pin 19. A ground-engaging shoe 26 is releasably fastened to sidebars 11, 12 in a conventional manner by bolts 27 and nuts 28. The sidebars 11 and 12 have counterbores 31, 32 into which the axially opposite ends of bushing 21 extend and in which seal components 33 are installed.

In FIG. 3, the seal component 33 is viewed in section taken on a plane through the axis 38 of the seal component 33 and is shown in its free state, that is, in its uninstalled state. The seal component includes a hard, relatively inflexible seal ring portion 34 presenting a flat annular seal face 35 at one axial end. The seal component 33 also includes a resiliently flexible annular portion 36 which is bonded to the other axial end of the ring portion 34. The ring portion 34 may be made of a relatively hard plastic material and the flexible portion 36 may be made of neoprene or buna N synthetic rubber.

The flexible annular portion 36 as shown in FIG. 3, may be described as having a convex surface 41 which is formed by revolving a curve about axis 38, the curve extending from the inner diameter of ring portion 34 axially in a substantially elliptical path to a point 42 spaced radially outwardly and axially from the outer diameter of the ring portion 34.

The flexible annular portion also has a concave surface 37 formed by revolving a curve about axis 38, the curve extending from the outer diameter axially and radially outwardly to point 42. It will be noted that point 42 is at the outer diameter of the flexible annular portion 36 and that concave surface 37 is at a right-angle relationship to convex surface 41 at their juncture, that is at point 42. As illustrated in FIG. 3, the line $t$ tangent to convex surface 41 at point 42 is normal to the plane $p$ defined by sealing face 35. The edge at the junction of the convex and concave surfaces 41, 37 serve on installation in the track line to effectively prevent foreign material from entering between the flexible portion 36 and counterbore 32. It will be noted that this edge is in substantially right-angle relationship to the counterbore 32 in the expected range of seal cavity sizes shown in FIGS. 4, 5 and 6, thus forming an effective static seal in all conditions. In the free state of the seal component 33 the axial dimension of the flexible portion 36 is greater than the radial dimension $d$ of its section, as viewed in FIG. 3, and the inner diameter of the flexible portion 36 is the same dimension as the inner diameter of the ring portion 34.

Referring to FIG. 4, it will be seen that the sealing face 35 of seal portion 34 is in sealing engagement with a finished end surface 48 of bushing 21. It will be noticed that the flexible portion 36 has been compressed to a different shape from that shown in FIG. 3 due to its being pressed axially and radially as it is installed. As illustrated, the surface 41 of flexible seal portion 36 has a substantial area of contact with the walls defining the seal cavity 39, these walls being cylindrical counterbore surface 32 and bottom surface 40 which faces toward surface 48 on the end of bushing 21. In order to provide an endless track belt at a reasonable price to the user, it is customary and necessary to permit a reasonable range of tolerances for manufacturing and assembly. It will be noticed in FIGS. 4, 5 and 6 that there are three different conditions of tolerance buildup producing normal, undersized and oversized conditions in the seal cavity 39.

FIG. 4 shows the normal condition of assembly; whereas FIG. 5 represents an assembled condition and parts tolerance situation in which the cavity 39 for seal 33 has been reduced substantially and FIG. 6 shows the condition of the seal 33 when the seal cavity 39 is oversize in relation to its normal size shown in FIG. 4. The design of the flexible portion 36 of seal 33 of this invention permits it to adapt to an acceptable configuration in all three of these situations and to apply proper axial thrust to effectively seal the pin and bushing joint. The flexible portion 36 is designed so that normally (FIG. 4) it is radially spaced from the pin thereby presenting an unoccupied pocket of the cavity 39. In the reduced volume condition of the seal cavity 39, as shown in FIG. 5, the flexible portion 36 is axially flattened to such an extent that the inner diameter of surface 41 contacts the pin. In this condition the axial dimension of the flexible portion 36 is less than the difference in the radii of the pin 19 and counterbore 32.

By making the radially outward-facing part of face 41 of an axial dimension e which is slightly greater than the width f of the seal ring face 35 and by forming the flexible portion so as to have a larger outer diameter than the counterbore 32 sufficient force and contact area will exist in the least-compressed condition of the seal component 33, as shown in FIG. 6, to prevent the seal from turning in the counterbore 32. By positioning the seal ring portion 34 in radially spaced relation to the pin 19 and counterbore 32 and by spacing the inner diameter of flexible portion 36 from the pin 19, space is provided in the cavity for the flexible portion to expand into when the track link is assembled without causing the flexible portion to rupture. Also it has been found that bonding the flexible portion 36 only to the axial end 43 of the ring portion 34 opposite the sealing face 35 materially reduces failures heretofore occurring in the flexible portion at and adjacent the junction of the flexible and seal ring portions of seal components of the type shown in U.S. Pat. 3,244,457.

The embodiments of the invention in which I claim an exclusive property or privilege are defined as follows:

1. An annular seal component for a face-type seal comprising:
   a hard, relatively inflexible annular seal ring portion having an annular sealing face at one axial end thereof and
   a resiliently flexible annular portion bonded to the other axial end of said ring portion and extending in one axial direction therefrom, said flexible annular portion having
   a convex surface formed by a revolving curve extending from the inner diameter of said ring portion axially in a substantially elliptical path to a point spaced radially outwardly and in said one axial direction from the outer diameter of said ring portion and
   a concave surface formed by revolving a curve extending in said one axial direction from said outer diameter of said ring portion and radially outwardly to said point.

2. The invention of claim 1 wherein said point is at the outer diameter of said annular portion.

3. The invention of claim 1 wherein said concave surface has an approximate right-angle relationship to said convex surface at said point.

4. The invention of claim 3 wherein a line tangent to said convex surface at said point is approximately normal to the plane defined by said sealing face.

5. The invention of claim 4 wherein the axial dimension of said flexible annular portion is greater than the radial dimension of a section thereof in a plane passing through the axis of said seal component.